Nov. 25, 1930.  B. Z. MOSKOWITZ  1,782,437

VACUUM TUBE SOCKET

Filed April 26, 1926

INVENTOR
Ben Zion Moskowitz
BY
ATTORNEY

Patented Nov. 25, 1930

1,782,437

UNITED STATES PATENT OFFICE

BEN ZION MOSKOWITZ, OF BROOKLYN, NEW YORK, ASSIGNOR, BY MESNE ASSIGNMENTS, TO PILOT RADIO & TUBE CORPORATION, OF BROOKLYN, NEW YORK, A CORPORATION OF DELAWARE

VACUUM-TUBE SOCKET

Application filed April 26, 1926. Serial No. 104,550.

This invention relates to improvements for sockets being more particularly directed to shock absorbing sockets for use in radio apparatus.

There are in present use several types of shock absorbing sockets, which comprise two sections movable relatively towards one another, which sections are interconnected by flexible metallic members. This type of socket requires considerable amount of excess material, in particular one insulated member is adapted to form the support for the complete socket member which is independent thereof, and whose only connection therewith is by a series of independent members, which to be sure, combine to collectively form a resilient socket member and its support.

Other types of socket members comprise resilient contacts which receive the prongs extending from the vacuum tube, but due to the fact that the socket proper in which the prongs are held, is fixed to a panel member; the tube itself is not supported in flexible resilient relation with respect to the panel member proper.

It is then, particularly the purpose of this invention to provide a simple spring or flexible metallic member co-operating directly with the socket member, and adapted to so support it on a panel member, whereby the socket member itself assumes a resilient relation with respect to the panel, irrespective of the angular direction of the shock or force applied thereto.

This is carried out by providing a single metallic spring member of a particular configuration, whereby parts thereof are directly attachable to the socket member proper, and the remaining portions thereof are attachable to the panel member, the resilient spring member being so shaped whereby any downward or sideward movement, or movement in any direction of the socket member proper will cause a flexing of the spring and consequently provide for a non-jarring and resilient effect upon the tube being urged into or being present in the socket member.

Further it is an object of this invention to provide for a simple stamped metallic member so bent at its central portion and offset at its end extremities, whereby to provide attaching means at its end extremities to both the socket member proper and the panel member, and due to its particular angular formation with respect to the respective ends associated with the socket member proper and the panel member, to respond to any movement in any plane by a flexing action due to the action of the resilient spring member, and thus provides for a shock absorbing effect upon the socket.

In general, it is aimed to provide a simple and durable shock absorbing socket capable of simple construction, efficient in application, and low in production cost.

Specifically it is an object of this invention to provide a resilient socket for use in radio apparatus, wherein the socket proper for receiving the vacuum tube is supported on a resilient member, whereby movement of the vacuum tube within the socket or a movement of both the socket and the vacuum tube therein are counteracted and compensated by the flexing of this resilient member.

Still further, it is aimed to provide a novel form of resilient support consisting of stamped and bent metal member, portions which are attachable directly to the socket member, and other portions of which are connected to the panel or support, the respective portions attachable to this support being directed in opposite planes and offset from one another, and being connected to one another at a point centrally disposed and integral with the said portions.

Still further, it is aimed to provide a novel resilient support for socket members capable of being attached to any form of socket members whatsoever, and serving upon movement to the socket member or tube within the socket member to flex and eliminate any shock whatsoever to the tube within the socket.

And finally, it is aimed to provide a universal type of resilient socket support attachable at some of its end extremities to the base of a socket member, and at its other end extremities, to a panel or supporting member, the respective arms or portions thereof being offset from one another and in opposite planes, whereby, an angular movement in any direction provides for a flexing within the resilient supporting member, and a consequent elimination of any shock whatsoever to the socket or the vacuum tube within the socket.

These and other advantages, capabilities, and features of the invention will appear from the subjoined detail description of one specific embodiment therefor illustrated in the accompanying drawings, in which Figure 1 is a plan elevation of the device.

Figure 3:
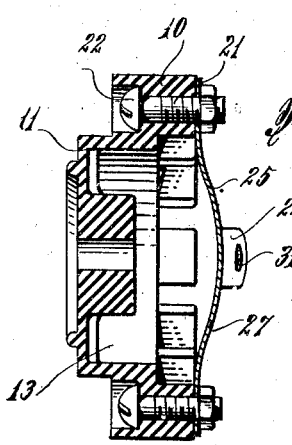
Figure 3 is a side elevation and section along the lines of 3—3 of Figure 1, indicating the method of attachment to the device of the socket proper.

Referring to the drawings in detail, the construction shown comprises an insulating casing 10 forming the supporting base or socket member for a vacuum tube. This base 10 as shown in Figure 3 comprises a hollow body portion formed of a phenolic condensation product and having a head portion 11 extending upwardly therefrom. Within this head portion there is formed as by molding a series of apertures 12 into which apertures there is adapted to be urged the prongs projecting from the base of the vacuum tube not shown. Adjacent the respective apertures 12 and extending upwardly within the hollow interior 13 of the base member 10 are the spring contact members 14 having bent U-shaped prong contacts 15, which are directly contacted with by a prong being urged from the apertures 12 in the socket member.

These conductors are attached directly to the base member 10 by being bolted to the said base member through members 16 positioned within the cut-out portions 17 formed along the periphery of the end side of the base member 10 adjacent the respective apertures 12. The end extremities 18 of the conductor member 14 have apertures 19 therein for forming contact with the remaining electrical contacts within the radio circuit.

The central head structure 11 is supported and made rigid at its interior surface by means of a reinforcing rib 20 in the form of a cross having a hub centrally disposed therein through which hub a further connection may be made as desired. Along the outer under periphery of the base there are formed a series of molded hubs 21 in each of which hubs there is adapted the pass bolt member 22. It is to these hubs that the resilient shock absorbing member 23 is attached at a plurality of its extremities.

Figure 1:
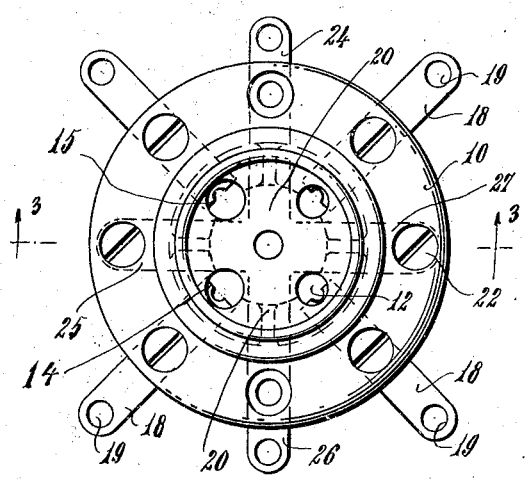
Figure 2:
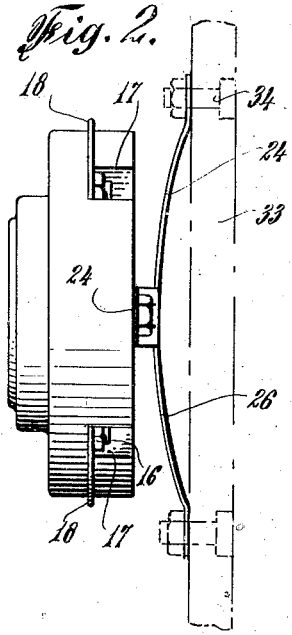
Figure 2 is a side elevation of the device showing the method of attachment to a panel member.
Figure 4:
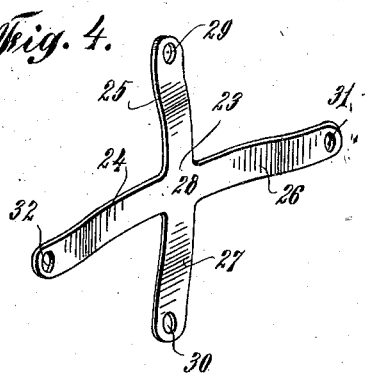
Figure 4 is an isometric view of the resilient supporting member unattached.

Referring to Figure 4 in detail, it should be noted that the shock absorbing member 23 comprised of four arms 24, 25, 26, and 27, although it is within the province of the invention to provide for a plurality of arms of varying number, as long as the attachment of the arms to the respective base of the socket member and the support for the socket member, will bring about a flexing of the same upon the slightest movement of either the socket member or the main panel or support therefor.

It is herein shown that arms 25 and 27 are flexed inwardly from the center 28 of the shock absorbing member 23, the end extremities of the same either being slightly bent outwardly in the opposite direction so that at their points of attachment 29 and 30 as indicated in Figure 3, the end extremities of the said arms are displaced considerably from the said central portion 28. The remaining arms 24 and 26 are bent in the opposite direction, that is outwardly from the center 28, being displaced inwardly slightly at the end extremities 31 and 32, where the arms are attached to the panel member or supporting base 33, of a radio set by means of the bolt members 34 and 35 passing through the apertures of the end extremities 31 and 32 of these respective arms.

Since the arms 25 and 27 are disposed in planes opposing each other, but are in the same flat plane at their common center, and also in planes opposing respectively the arms 24 and 26, so that when all the arms are considered together, the multiple resilience or shock absorbing power of the same is imparted upon the movement or actuation of the socket member or the support or panel member to which this resilient member 23 is attached. Thus the co-action of the arms 24 and 26 pressing through the common center 28 with respect to the socket member to which they are attached, and the simultaneous co-action of the arms 25 and 27 through the common center 28 against the panel support member 33, to which they are attached, will provide a resilient shock absorbing unit, since the complete spring structure 23 includes a series of arms, half of which are oppositely disposed from the other half, and which act in opposite planes to one another.

Consequently in this manner it is possible that a movement of the support member independent of the socket member, or vice versa, will be compensated by any or all of the respective arms forming the shock absorbing unit and consequently the elimination of any shock or breakage within the delicate instruments or members on the panel board, or within the socket is positively provided for.

It is obvious that various changes and modifications may be made to the details of construction without departing from the general spirit of the invention as set forth in the appended claims.

What I claim is:

1. A resilient supporting member for supporting vacuum tube sockets comprising a stamped metallic element having a plurality of arms, extending from a central surface, a socket portion, and a fixed support, alternate arms being offset in the same direction and being fixed to the base of a socket portion, and the remaining arms being similarly offset in another direction and attachable to the fixed support, whereby movement of a socket member produces a flexing of said resilient support member.

2. A shock absorbing element for vacuum tube sockets comprising a socket member, and a stamped metallic member having a plurality of arms offset from a common central plane, each of the arms being offset in a different direction, and adjacent arms being fixed to a socket member and a fixed panel support respectively, whereby movement in any plane of the socket member provides for a flexing of said shock absorbing element.

3. A resilient supporting member for vacuum tube sockets, comprising a resilient member having a plurality of arms offset from one another from a common central surface, means for attaching the extremities of alternate arms to a vacuum tube socket and means for attaching the extremities of the remaining arms independently of said socket whereby the socket may be displaced in varying planes without shock.

4. A shock absorbing unit for vacuum tube sockets comprising a flexible member having a plurality of arms extending angularly from a common central surface, adjacent arms being disposed in opposing planes, alternate arms being attachable to the vacuum tube socket and the remaining arms being attachable to a support whereby the vacuum tube socket may be displaced in varying planes without shock.

5. In a vacuum tube mounting, means for holding a vacuum tube, and a resilient member comprising a plurality of arms extending from a common central surface, adjacent arms being angularly displaced from said central surface and being offset in different planes with respect to one another, alternate arms being adapted to be connected to said means for holding the vacuum tube, and the remaining free arms being attachable to a support whereby movement in any plane of the vacuum tube holding means provides for a flexing of said resilient member.

BEN ZION MOSKOWITZ.